(12) United States Patent
James (10) Patent No.: US 9,416,544 B2
(45) Date of Patent: Aug. 16, 2016

(54) NON-PENETRATING ROOF-MOUNTED SUPPORT DEVICE

(71) Applicant: Edwin James, Pinellas Park, FL (US)

(72) Inventor: Edwin James, Pinellas Park, FL (US)

(*) Notice: Subject to any disclaimer, the term of this patent is extended or adjusted under 35 U.S.C. 154(b) by 0 days.

(21) Appl. No.: 14/594,203

(22) Filed: Jan. 12, 2015

(65) Prior Publication Data

US 2016/0201331 A1    Jul. 14, 2016

(51) Int. Cl.
*E04D 13/14* (2006.01)
*F16M 13/02* (2006.01)
*H02S 20/23* (2014.01)

(52) U.S. Cl.
CPC .............. *E04D 13/14* (2013.01); *F16M 13/02* (2013.01); *H02S 20/23* (2014.12)

(58) Field of Classification Search
CPC ......... E04D 13/14; F16M 13/02; H02S 20/23
USPC ............................................ 52/24, 25, 173.3
See application file for complete search history.

(56) References Cited

U.S. PATENT DOCUMENTS

| | | | | | |
|---|---|---|---|---|---|
| 866,881 | A | * | 9/1907 | Parker | B66F 3/08 248/357 |
| 2,380,692 | A | * | 7/1945 | Gunnison | E04B 1/36 254/98 |
| 3,027,140 | A | * | 3/1962 | Holzbach | E04G 25/06 248/354.3 |
| 3,222,030 | A | * | 12/1965 | Thorpe | E04F 15/02452 248/354.3 |
| 4,160,347 | A | | 7/1979 | Logsdon | |
| 4,404,780 | A | * | 9/1983 | Josephson | E04B 1/34352 248/357 |
| 4,648,220 | A | * | 3/1987 | Gebelius | E02D 5/38 405/237 |
| 4,758,003 | A | * | 7/1988 | Goldstein | F16L 5/04 174/76 |
| 5,226,263 | A | * | 7/1993 | Merrin | E04D 13/1476 285/42 |
| 5,561,950 | A | * | 10/1996 | Collins | E02D 27/32 248/354.3 |
| 5,685,508 | A | | 11/1997 | Smith | |
| 7,168,210 | B2 | | 1/2007 | Krovats | |
| 7,435,897 | B2 | | 10/2008 | Russell | |
| 8,177,180 | B2 | | 5/2012 | Plaisted et al. | |
| 8,250,829 | B2 | * | 8/2012 | McPheeters | E04D 13/1476 136/244 |
| 8,316,617 | B2 | | 11/2012 | Krovats | |
| 2003/0101662 | A1 | * | 6/2003 | Ullman | E04D 13/12 52/27 |
| 2010/0101634 | A1 | * | 4/2010 | Frank | H02S 20/25 136/251 |
| 2011/0094169 | A1 | * | 4/2011 | Bellavia | E04D 1/205 52/173.3 |
| 2011/0138602 | A1 | * | 6/2011 | Stanley | E04D 13/1407 29/428 |
| 2012/0126529 | A1 | * | 5/2012 | Beall | E04D 13/1407 285/42 |
| 2012/0222380 | A1 | * | 9/2012 | Wentworth | E04D 13/1407 52/698 |
| 2013/0081346 | A1 | * | 4/2013 | Kulprathipanja | E04B 1/6801 52/483.1 |

OTHER PUBLICATIONS

Unknown, Foam Jack, Website.

* cited by examiner

*Primary Examiner* — Brian Glessner
*Assistant Examiner* — Paola Agudelo
(74) *Attorney, Agent, or Firm* — Larson & Larson, P.A.; Justin P. Miller; Patrick A. Reid (57) ABSTRACT

Disclosed within is a support that attaches to the roof without mechanical fasteners, results in only minor increases to the roof load by requiring no ballast, and bonds to the surface of the roof. The result is a roof that is stronger with the roof supports than without, and a roof with an enhanced ability to perform its functions.

The roof support device consists generally of a baseplate, a column affixed to, or intrinsic to, the upper surface of the baseplate, the column surrounding a rod, the rod protruding above the top of the column. The roof support device is preferably affixed to a roof using an adhesive applied the underside of the baseplate. The roof support device is installed using spray foam, which acts to strengthen the bond with the roof, and providing additional protection against water infiltration.

16 Claims, 7 Drawing Sheets

NON-PENETRATING ROOF-MOUNTED SUPPORT DEVICE

FIELD

The invention relates generally to a support designed to connect devices to the roof of a building, and in particular to a support that provides for a secure connection to a roof without penetrating the roof using mechanical fasteners.

BACKGROUND

For as long as buildings have existed, people have needed to attach objects and devices to roofs. For example, antennas, water sources, devices for power generation, platforms, air conditioners, and so forth. But merely placing a device on a roof is problematic because it may blow away, wash away, or fall off. Thus, the devices are generally attached.

Commonly, the attachment of the devices is by mechanical fasteners, affixing the device to the underlying support structure of the roof. Or the devices may be weighed down using ballast, such as concrete pavers.

But these prior art solutions have drawbacks, which are addressed by the invention disclosed within.

SUMMARY

While the prior art solutions provide stability to devices on roofs, they also compromise the integrity of the roof.

The roof of a building exists to fulfill certain requirements. The roof must keep water out of the building, reduce the transfer of heat into the building in the summer, and the reduce transfer of heat out of the building in the winter. The roof must shade the occupants, and deflect wind. The roof must in turn be supported by the structure of the building below, the structure sized to support the weight of the roof structure, transient loads such as snow and wind, and permanent loads such as shingles.

The prior art methods of attaching devices to the roof of a building affect the roof's ability to perform these functions.

Attaching devices to a roof using mechanical fasteners requires penetration of the roof, creating a roof that is no longer watertight. One may attempt to overcome this problem by applying a sealant, rubber layers, or caulk, but it is a flawed solution. Water always finds penetrations, it is but a matter of time.

Furthermore, mechanical fasteners create point loads on the roof, rather than spreading the load across the roof. Roofs are designed for loads across areas, such as from snow, rain, or wind. Not loads on specific points.

Given that the mechanical fastener focuses the connection on the individual locations of attachment, the fastener is only as effective as the specific point to which it is affixed. Thus, for maximum effectiveness the mechanical fastener must be located coincident with roof support structure. This makes installation more complicated because, while standing on the roof, it may be difficult to locate the underlying support structure. If a screw is put through the surface of a roof, but the screw doesn't enter the underlying support structure, minimal support is created.

The use of ballast is also problematic. If the devices to be affixed may catch the wind, such as solar panels, the uplift force created by a strong wind is significant. When the wind speed considered results from a tornado or a hurricane, this uplift force is tremendous. Thus, the corresponding ballast must be significant. If insufficient ballast is used, the devices become projectiles. If too much ballast is used, the structure supporting the roof will collapse. Ballast systems also creep, or move, on a roof. To counter this, ballast systems also require anchoring at specific points.

The solution is the roof support device described herein. It is a support that attaches to the roof without mechanical fasteners, results in only minor increases to the roof load by requiring no ballast, and bonds to the surface of the roof. The result is a roof that is stronger with the roof supports than without, and a roof with an enhanced ability to perform its functions.

A brief discussion of the roof support device is helpful. The roof support device consists generally of a baseplate, a column affixed to, or intrinsic to, the upper surface of the baseplate, the column surrounding a rod, and the rod protruding above the top of the column. The roof support device is preferably affixed to a roof using an adhesive applied to the underside of the baseplate.

The rod has two ends. The lower end optionally includes a terminating piece. The terminating piece is larger in diameter than the rod alone, preventing the rod from being pulled outward. The terminating piece may be as simple as a single nut that the roof support device is molded around, or two nuts tightened together with an optional washer, a welded plate, or similar.

The upper end of the rod interfaces with whatever is to be supported. Described within is an adjustable-angle solar panel support, although other devices or supports can be attached to the top of the rod of the roof support device, with the load in turn resting on the top of the column. The most common means of attaching devices to the top of the roof support device is a nut threaded onto the rod, but other attachment means as are known in the art are anticipated.

The bottom of the column flares outward as it approaches the base. This flared shape encourages water to flow away from the roof support device, preventing it from accumulating on or near the base.

The baseplate of the roof support device is attached to, or intrinsic to, the column above. The bottom of the baseplate is adapted to receive adhesive, in turn being bonded to the roof.

The roof support device can be made of many materials, including wood, metal, and plastic. Preferred embodiments are made of plastic, specifically plastics for which a compatible spray foam exists. For example, polyurethane plastic and polyurethane foam.

In order to understand how the roof support device interacts with the later-applied spray foam, an explanation of installation is helpful.

The roof support device is to be used most frequently in groups, rather than individually. Multiple roof support devices can be arrayed across a roof, creating a grid for attachment of additional structure.

The first step of installation is to determine the appropriate locations for installation of the roof support devices. This determination is based upon the strength required by the specific installation, as well as the local or state code requirements. But this determination need not take into account the location of the underlying support structure.

The second step is choosing an adhesive. For example, a polyurethane low-rise adhesive can be used, or any high-strength adhesive that is compatible with urethane, e.g., epoxies. The adhesive is applied to the roof, and the base of the roof support device is placed onto the adhesive. This step is repeated for as many roof support devices as are required for the given installation.

Following placement, a spray foam is applied to the roof support devices and surrounding roof. Acceptable spray foams are made from a urethane base material with a 2.5 to 3.0 lb per cubic foot.

The spray foam performs numerous functions. The primary function is to effectively expand the size of the baseplate of the roof support device. The spray foam bonds to the roof support device, and after the foam has cured, the resulting structure acts as a monolithic unit. Monolithic meaning something that constitutes or acts as a single, uniform whole.

The spray foam bonds to the roof support device, which results in a single unit. Two types of bonding are present. The first is dipole to dipole attraction, or Hydrogen bonding. The second is covalent bonding. In covalent bonding the NCO groups of the adhesive, such as a urethane adhesive, bond with the OH groups of the roof support device.

Testing performed by the inventor supports the assertion that the foam bonds to the roof support device, increasing its pull strength. The testing is discussed more thoroughly below.

Returning to the discussion of the system in general, the roof support device combined with foam, the foam rendering the roof stronger with the system than without. Not only does the foam strengthen the bond between the roof and the roof support device, but many other benefits are provided.

The foam creates a new upper layer, which is shaped to channel water away from the roof support device. In the absence of foam, the water will seek opportunities to wick into gaps through capillary action, such as into any gaps between the baseplate and the adhesive. Furthermore, while the adhesive used to affix the base of the roof support device to the roof is low-rise, it may still expand beyond the bounds of the base, and in turn curl up over the edge of the base. The result is locations where water may pool.

Secondary functions of the foam include preventing water infiltration below the baseplate, sealing the roof, and so forth.

Optionally, a UV top coating may be applied on top of the foam layer to prevent solar degradation and provide additional insulation value. Acceptable protective top coatings for urethane foam include: polyurea; silicone; and acrylic elastomers.

Attached to the top of the roof support device is an optional support bracket that allows for adjustment of the angle between the mounted system and the roof support device.

Finally, the upper structure is attached to the one or more roof support devices.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Reference will now be made in detail to the presently preferred embodiments of the invention, examples of which are illustrated in the accompanying drawings. Throughout the following detailed description, the same reference numerals refer to the same elements in all figures.

Figure 1:
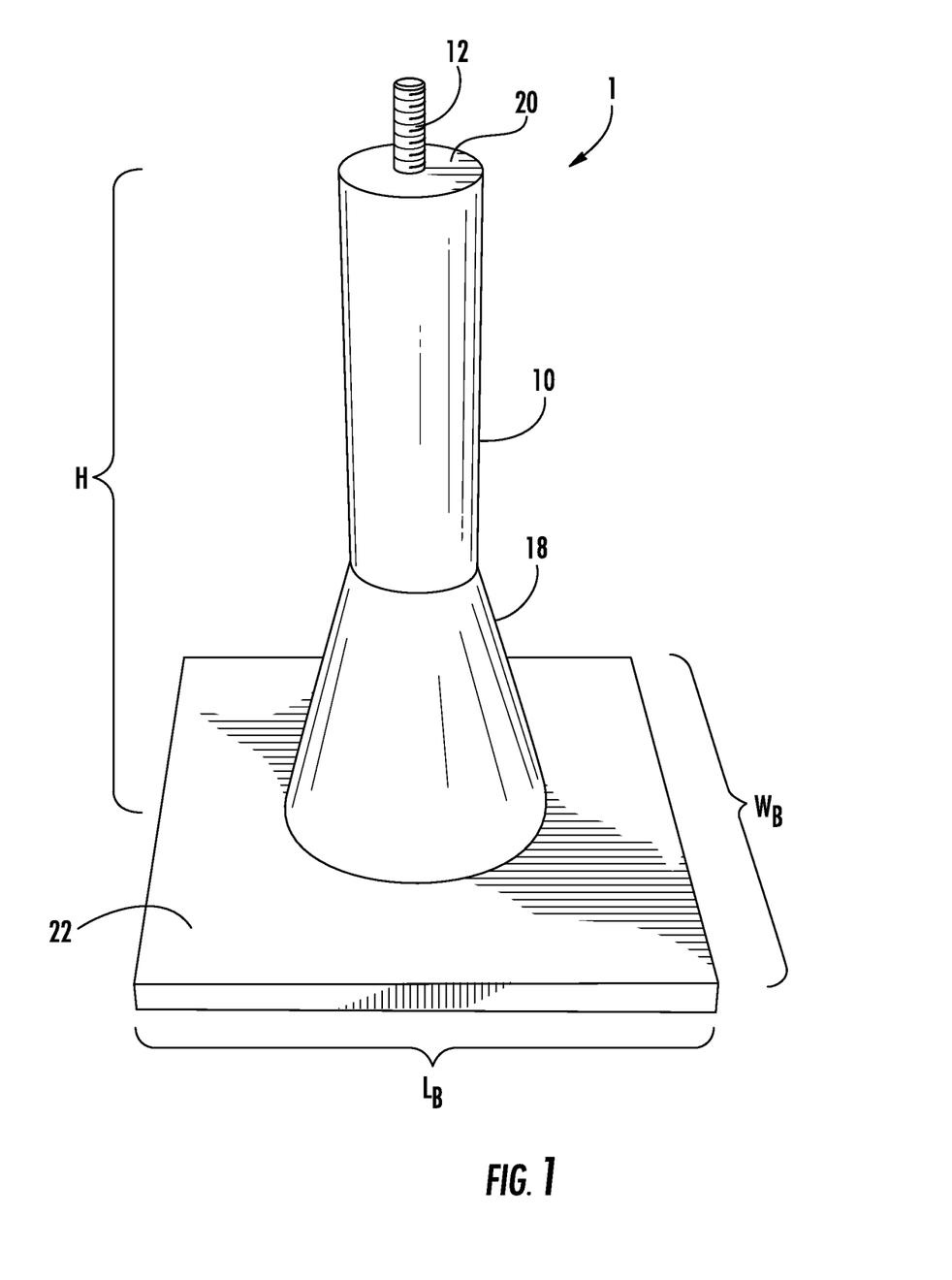
FIG. 1 illustrates an overall view of a first embodiment.

Referring to FIG. 1, an overall view of the roof support device 1 is shown. The central portion is column 10, with rod 12 protruding through support face 20. The lower section of column 10 optionally enlarges to form taper 18, which in turn connects to baseplate 22.

Baseplate 22 has a length $L_B$ and a width $W_B$. The height of roof support device H is also shown, from the bottom of base 22 to the support face 20.

Figure 2:
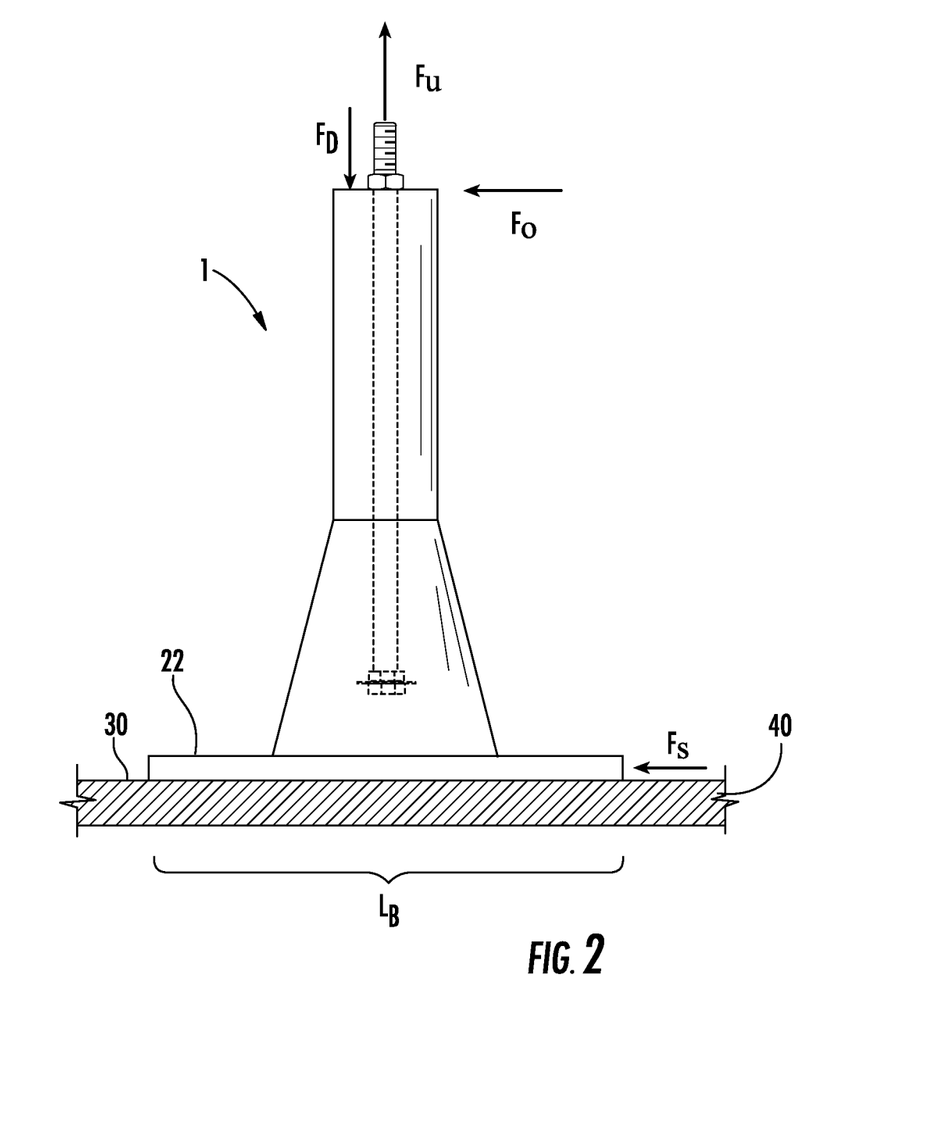
FIG. 2 illustrates a side view the first embodiment, without foam.

Referring to FIG. 2, a side view of the roof support device is shown. Base 22 is shown affixed to roof 40 by adhesive 30. Adhesive 30 is a thin layer, and is not visible in FIG. 2.

Rod termination 14, also referred to as the terminating piece, and nut 16 are shown. Rod 12 starts above support face 20, penetrating through column 10.

The roof support device 1 may be constructed of individual pieces that are attached together, or it may be a molded unitary structure. Rod 12 may be inserted into the column 12 following construction, or preferably, the roof support device may be molded around the rod.

Numerous forces that are applied to the roof support device 1 during use are shown: upward force $F_U$ applied to the rod 12; downward force FD representing the weight of the supported structure against the support face 20; overturning force $F_O$ representing the force that attempts to rotate the roof support device 1, such as may exist as a result of wind load; and shear force $F_S$, representing the side load resisted by the adhesive and foam, which in turn prevents the roof support device 1 from sliding across the roof 40.

The length of the base is shown as $L_B$. Given that this figure includes only adhesive 30, and no foam, there is no other length shown. The importance of this will become clear in the remaining figures.

Figure 3:
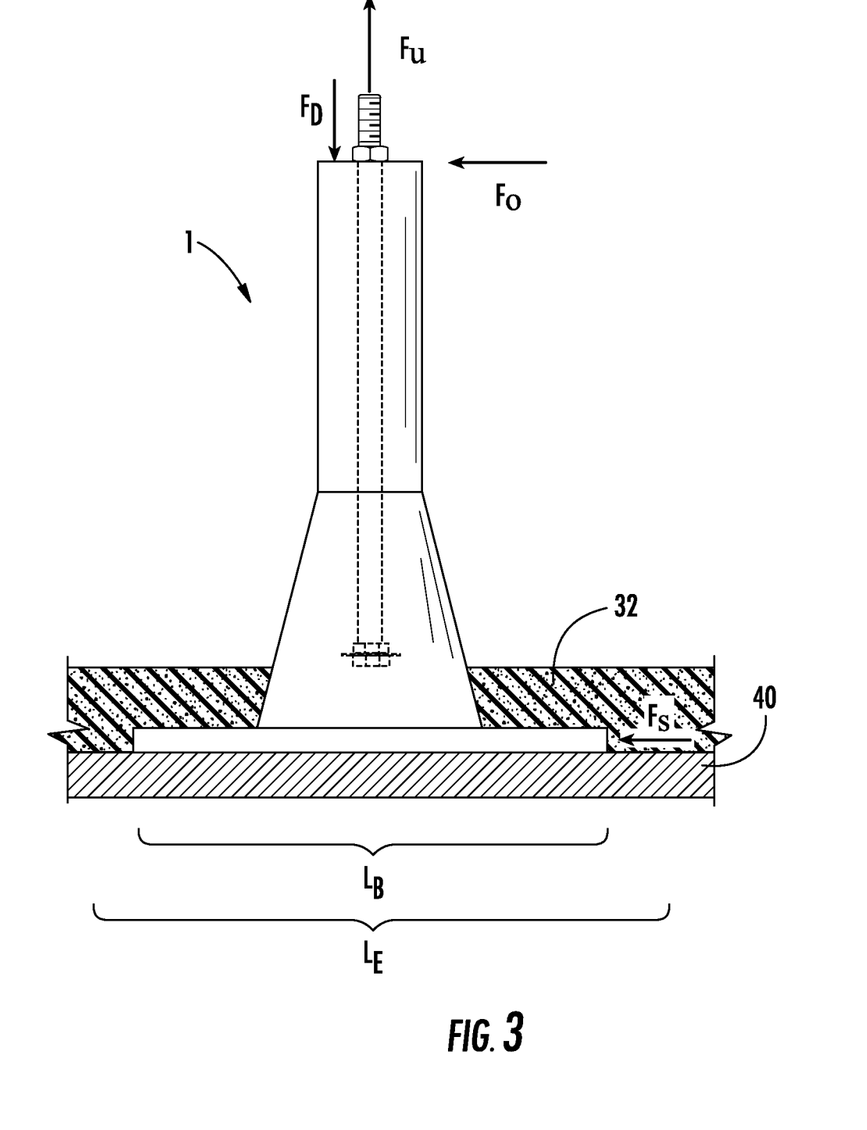
FIG. 3 illustrates a side view of the first embodiment, including foam.

Referring to FIG. 3, a side view of the roof support device is shown, including a foam layer. In addition to the elements discussed above, further shown is a layer of foam 32. The foam is applied to entirely cover the base, as well as a portion of the taper 14 of the column 12.

While $L_B$ remains the same, $L_E$, or the effective length of the base 22, is also shown. $L_E$ represents how large the base 22 would have to be to provide the strength in the absence of any foam 32. The length $L_E$ is greater than $L_B$.

Figure 4:
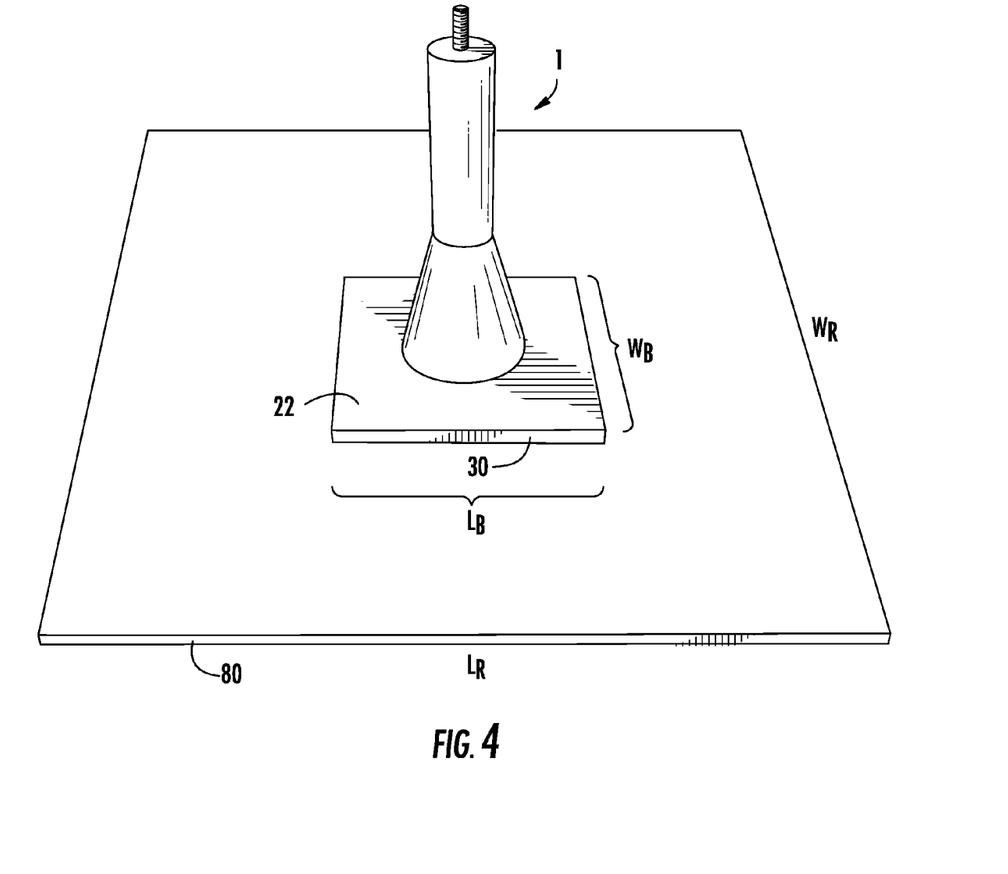
FIG. 4 illustrates an overall view of the first embodiment, without foam.
Figure 5:
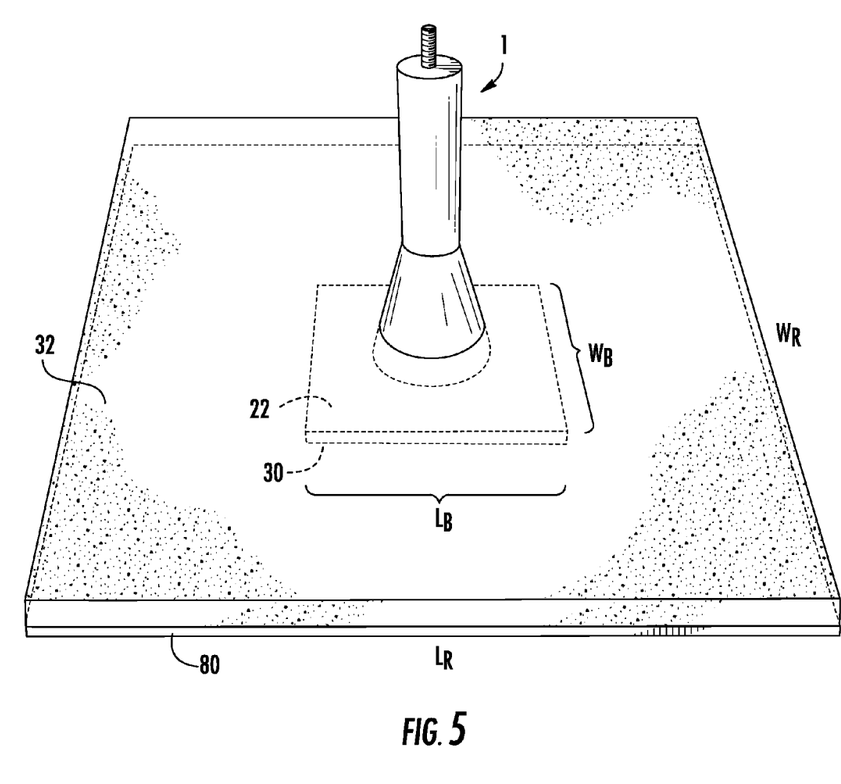
FIG. 5 illustrates an overall view of the first embodiment, with foam.

Referring to FIGS. 4 and 5, an overall view of the roof support device is shown, as prepared for testing.

In order to support the assertion that the addition of foam 32 strengthened the bond between the roof support device 1 and a roof, the client performed three tests. The test plate 80 was plywood, representing a weak roof bonding surface.

FIG. 4 represents Test 1, wherein a roof support device 1 was attached to the center of the test plate 80, here a 4'-0" by 4'-0" sheet of plywood, by adhesive 30 only. The sample was then allowed to cure for seven days.

FIG. 5 represents Test 2, wherein the roof support device 1 was attached to the center of the test plate 80, here a 4'-0" by 4'-0" sheet of plywood, by adhesive 30. The adhesive was allowed to cure for twenty minutes. Then, the roof support device was covered by a 1.5" layer of spray foam 32. The sample was then allowed to cure for seven days.

Test 3 was simply three copies of FIG. 5 placed next to one-another on the same test plate 80. In Test 3, three roof support devices were attached to a 12'-0" by 4'-0" sheet of plywood, by adhesive 30, each roof support device 1 spaced to effectively have a non-overlapping 4'-0" by 4'-0" space around itself. The adhesive was allowed to cure for twenty minutes. Then, the roof support device was covered by a 1.5" layer of spray foam 32. The sample was then allowed to cure for seven days.

Following cure, the roof support devices were pulled upward until failure. Multiple iterations of the test were performed in order to ensure accurate measurements.

The results of the tests are as follows:

| Test 1 - glue only | | | |
| --- | --- | --- | --- |
| Test number | Area of base (ft$^2$) | Initial Load Failure (lb) | Failure pressure (lb/ft$^2$) |
| 1 | 0.3403 | 1270 | −3732 |
| 2 | 0.3403 | 1411 | −4146 |
| 3 | 0.3403 | 1046 | −3074 |
| | | Average | −3651 |

| Test 2 - glue and 1.5" foam layer | | | |
| --- | --- | --- | --- |
| Test number | Area of base (ft$^2$) | Initial Load Failure (lb) | Failure pressure (lb/ft$^2$) |
| 1 | 0.3403 | 1975 | −5804 |
| 2 | 0.3403 | 1694 | −4978 |
| 3 | 0.3403 | 1835 | −5392 |
| | | Average | −5391 |

| Test 3 - three footers - glue and 1.5" foam layer | | | |
| --- | --- | --- | --- |
| Test number | Area of base (ft$^2$) | Initial Load Failure (lb) | Failure pressure (lb/ft$^2$) |
| 1 | 0.3403 | 1905 | −5598 |
| 2 | 0.3403 | 1694 | −4978 |
| 3 | 0.3403 | 2117 | −6221 |
| | | Average | −5599 |

As a note, the pressures are denoted as negative numbers because the force was upward, and thus the pressure was away from the plywood surface.

Comparing Test 1 to Test 2, the data shows that the application of foam increased the failure pressure by 50%.

Comparing Test 2 to Test 3, the data shows that placing roof support devices as close as 8'-0" center-to-center has little effect on the pulling pressure. The data shows that adjacent devices do not interact poorly with each other. Thus, there is no adverse effect on strength.

Figure 6:
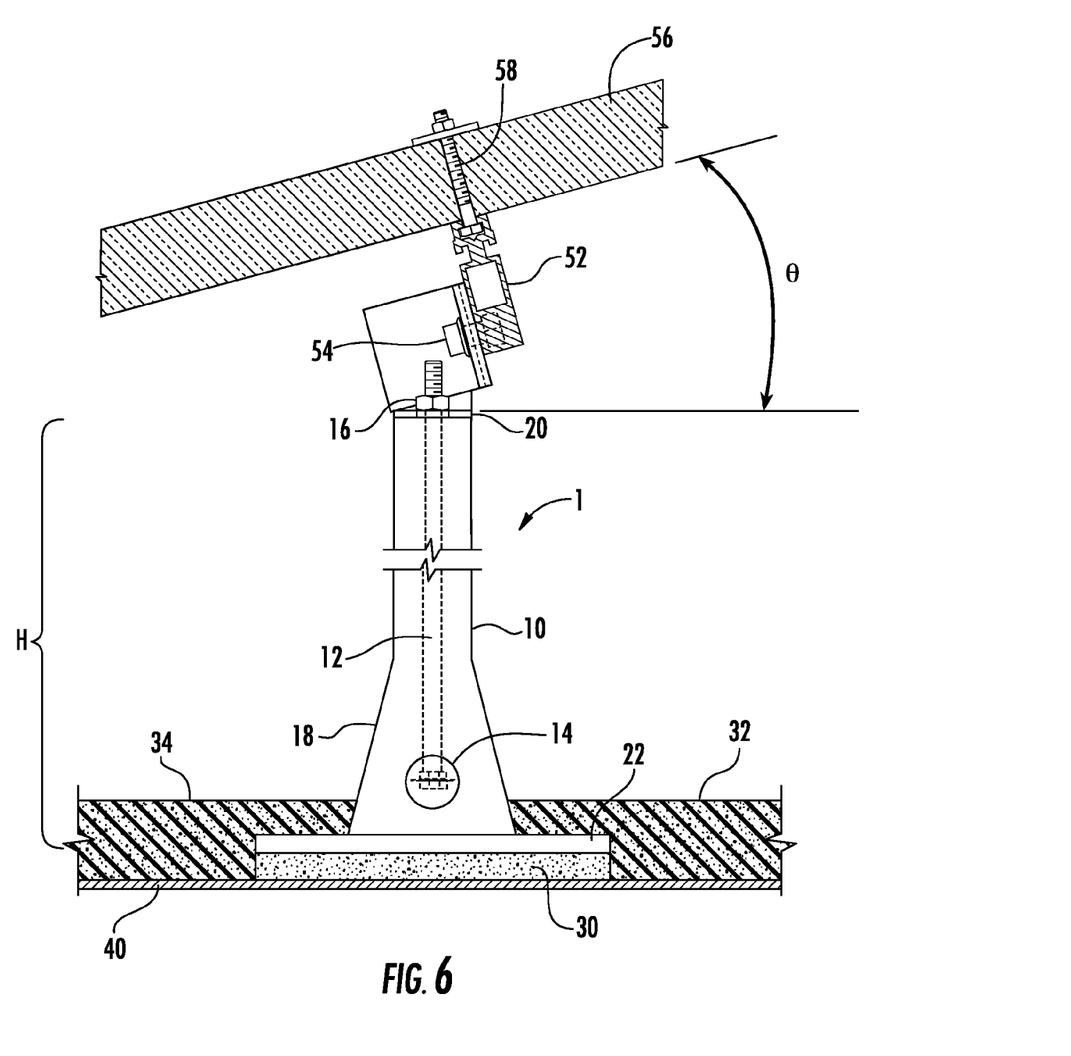
FIG. 6 illustrates an overall view of a second embodiment that includes a mounting bracket and rail system.

Referring to FIG. 6, an overall view of the roof support device 1 is shown, including foam 32. Support bracket 50 is shown attached to the top of the roof support device 1, held against support face 20 by nut 16. Support bracket 50 is in turn attached to rail 52 by rail attachment point 54. Rail 52 is attached to solar panel 56 by mid clip 58.

Support bracket 50 provides adjustment to the angle, the resulting angle of solar panel with respect to horizontal being θ.

Figure 7:
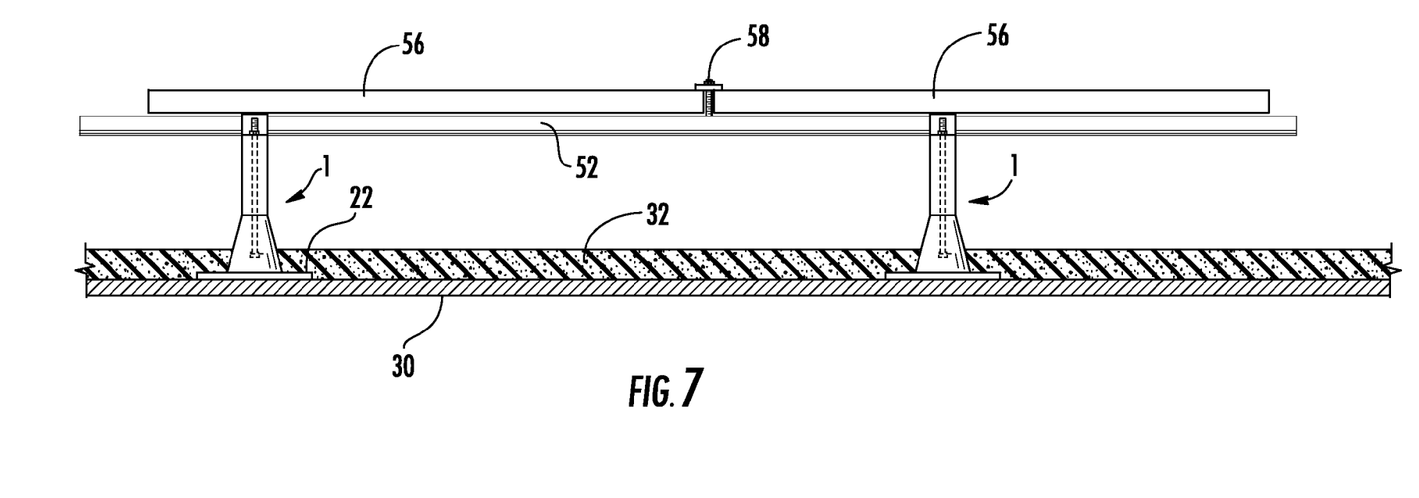
FIG. 7 illustrates multiple devices with foam, connected via one or more rails.

Referring to FIG. 7, multiple roof support devices 1 are shown, connected via one or more rails 52. The foam 32 is continuous across the roof support devices 1, creating a new upper layer to the roof.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction, and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A support that attaches to a roof using only adhesives, the support comprising:
   a. a baseplate;
   b. the baseplate configured for use with a roof-applied adhesive;
   c. the baseplate having an upper surface and a lower surface;
   d. a column, the column having two sections:
      i. a flared lower section with a downwardly-increasing diameter;
      ii. the flared lower section directly attached to the upper surface of the baseplate; and
      iii. a cylindrical upper section;
   e. a rod;
   f. the rod partially surrounded by the column, and partially protruding above the cylindrical upper section of the column; and
   g. wherein the support is attached to the roof using a combination of a layer of the roof-applied adhesive and spray foam, the spray foam covering the entire baseplate and a portion of the column, the spray foam increasing adhesion to the roof and preventing infiltration of water.

2. The support that attaches to a roof using only adhesives of claim 1, wherein the baseplate is free of penetrations.

3. The support that attaches to a roof using only adhesives of claim 1, wherein the baseplate and the column are molded as a single unit.

4. The support that attaches to a roof using only adhesives of claim 1, wherein the rod does not penetrate the baseplate.

5. The support that attaches to a roof using only adhesives of claim 1, wherein the rod is at least partially threaded, a threaded portion of the rod being at least that which protrudes above the cylindrical upper section of the column.

6. The support that attaches to a roof using only adhesives of claim 5, wherein the baseplate and column are molded around the rod.

7. The support that attaches to a roof using only adhesives of claim 1, further comprising:
   a. a rod termination;
   b. the rod termination for preventing the rod from being pulled upward, through the column, by an uplifting force; and
   c. the rod termination located on a lower portion of the rod, fully enclosed by the column of the roof support device.

8. A roof support system for installation on a roof, the installation requiring no penetration of the roof with fasteners, the roof support system comprising:
   a. a roof support device consisting of:
      i. a baseplate;
      ii. a column with an upper cylindrical section and a lower tapered section;
      iii. the lower tapered section of the column directly affixed to an upper surface of the baseplate;
      iv. the column including a support face located at an upper surface of the upper cylindrical section of the column, upon which an attached load will rest; and v. a rod, the rod partially surrounded by the column;
b. an adhesive;
c. the adhesive applied during installation between the baseplate of the roof support device and the roof; and
d. a spray foam;
e. the spray foam applied across the baseplate of the roof support device, a portion of the column, and a section of roof surrounding the baseplate; and
f. whereby the spray foam creates an additional bond between the roof and the roof support device, the result being that any load applied to the roof support device is spread across the roof.

9. The roof support system of claim 8, wherein the column is molded around the rod.

10. The roof support system of claim 8, further comprising:
a. a rod termination;
b. the rod termination for preventing the rod from being pulled upward, through the column, by an uplifting force; and
c. the rod termination located on a lower portion of the rod, fully enclosed by the column of the roof support device.

11. The rod support system of claim 10 wherein the rod termination comprises two nuts and a washer.

12. The roof support system of claim 8, further comprising:
a. one or more additional roof support devices;
b. a rail;
c. the rail resting on the support face of the roof support devices, joining the roof support devices, creating a structure that spreads out load among roof support devices.

13. The roof support system of claim 8, further comprising:
a. a support bracket with an adjustable angle;
b. the support bracket in direct contact with the support face of the roof support device; and
c. a rail;
d. the rail attached to the support bracket, allowing for adjustment of an angle of the rail with respect to the roof support device.

14. The roof support system of claim 8, wherein the baseplate and the column are constructed as a single piece.

15. A method of creating an attachment point on a roof, comprising the steps of:
a. applying an adhesive foam to the roof;
b. positioning a roof support device on the adhesive foam, the roof support device comprising:
i. a baseplate;
ii. a column with an upper cylindrical section and a lower tapered section, the lower tapered section of the column directly affixed to an upper surface of the baseplate
iii. a threaded rod, the threaded rod partially surrounded by the column;
c. waiting for the adhesive foam to cure; and
d. applying a layer of spray foam to cover the baseplate of the roof support device and a portion of the roof, sloping the foam away from the roof support device for drainage.

16. The method of creating an attachment point on a roof of claim 15, further comprising the steps of:
a. repeating steps a through c, positioning the roof support devices in a grid pattern; and
b. applying the layer of foam to the multiple roof support devices, creating a unitary structure.

* * * * *